May 8, 1973  G. SANTERO  3,732,149

APPARATUS FOR THE LARGE SCALE GROWTH OF LIVING CELLS

Filed Sept. 16, 1970

United States Patent Office 3,732,149
Patented May 8, 1973

3,732,149
APPARATUS FOR THE LARGE SCALE GROWTH OF LIVING CELLS
Giovanni Santero, Milan, Italy, assignor to Societa Farmaceutici Italia (Farmitalia), Milan, Italy
Filed Sept. 16, 1970, Ser. No. 40,354
Int. Cl. C12b 1/00
U.S. Cl. 195—139    5 Claims

ABSTRACT OF THE DISCLOSURE

Apparatus for growing cell cultures wherein a plurality of uniform columns in which cell cultures can grow are clamped together at the ends with manifolds which are fixed onto a shaft parallel to the columns so that the columns may be rotated about the shaft; the clamped columns also fixed to a support frame and there are means provided for rotating the shaft about a horizontal axis and for rotating the support frame about a vertical plane.

---

My invention relates to a method and apparatus for growing living cells on a large scale.

More particularly, my invention is for a method and equipment for growing in monolayer living cells such as eumycetes, schizomycetes and algae and for the large scale production of virus, vaccines and biologicals both for human and veterinary use.

It is well known that the production of vaccines preventing virus diseases, has passed through different chronological sublayer phases for growing said virus: the large susceptible domestic animal (either cattle or horse), passage on small laboratory animals, then on embryonated eggs and finally culture of cells (either monolayer or suspension). The virus production on tissue culture monolayers is obviously a technical and economical progress as to the two previous techniques. It is also known that large amounts of living cells are necessary for the industrial scale production of many vaccines. These cells cannot be grown in suspension in suitable fermenter vessels like the biosynthetic production of antibiotics, ergot alkaloids and similar. In fact, the production of vaccines and biologicals for human use is restricted to the tissue-cultures of normal non-cancerous tissue-cells, such as primary explants and cell strains.

It is known that one of the typical tissue-culture processes for the production of vaccines is carried out in "Roux" or "Brockway" flasks. The total capacity of one Roux flask is of about 1 liter and the inside surface for the growth in monolayer is of 250 square cms. The nutrient medium containing a suspension of cells is introduced into the sterilized flasks and these are incubated in horizontal position until the cell growth forms a uniform monolayer. The growth medium is removed and replaced with a maintenance medium containing the virus which penetrates the cells and multiplies. When the virus has reached the due concentration, the contents of the flasks is taken up and processed to make vaccines.

The method of the stationary "Roux" flasks was improved by the so-called method of the "rolling bottles." Bottles were placed in special stainless wire-baskets containing about twenty round flasks each. By this method, a considerable increase in the capacity of producing the vaccines is reached according to the volume. However, both methods show remarkable disadvantages restricting the industrial production because the handling is too complex and fractionated because of the many bottles required. As a result, many skilled workers are necessary and the contamination of the biologicals is very probable owing to the opening, filling, emptying and closing of each flask.

Another disadvantage of the tissue cultures in flasks is the impossibiltiy of checking and monitoring the metabolism of the tissue cultures themselves by removing the carbon dioxide, introducing oxygen, further nutrient medium or drawing cells as the flasks is a "closed" unit excluding any automatic working to operate under sterile conditions. Obviously the abovementioned disadvantages all affect the prices of the end-products.

A so-called "tissue culture propagator" was described in Canadian Patent No. 787,391. This "tissue culture propagator" consists of a certain number of glass or suitable plastics plates fixed on an appropriate mount and spaced. It is placed in a suitable vessel having at one end, a suitable airtight cover provided with a fishing pipe, a pipe, a drawing pipe and a stirrer. This "tissue culture propagator," which is characterized by a certain technical progress in comparison with the cultures in rolling bottles, shows remarkable disadvantages. It, in fact, does not permit carrying out the whole cycle of "closed" line operations in a quite automated manner with the possibility of checking all the phases thoroughly and no danger of contamination from and to the outside. I have surprisingly found and worked up a new method and apparatus for growing living cells in monolayer as well as eumycetes, schizomycetes and unicellular algae.

An object of my invention is a new method and apparatus for the large-scale monolayer production of cells as primary explants, diploid cell strains or continuous cell lines as well as the subseqeunt production of virus, vaccines and biologicals both for human and veterinary use. The staff, the rooms and the equipment of the usual above mentioned techniques are not required. The cell culture by the method of the present invention briefly called "method of the rotary columns," consists in clamping, in a single unit, a multitude of columns with manifolds placed at the two ends. The columns may be made of glass, plastic or another material suitable to the growth of cells. The apparatus is placed in a room or coated with a warm and cold thermo-adjustable jacket and provided with devices which allow the sheaf of columns to rotate on their major axis and to bring it to the vertical position. The whole cycle for the growth of living cells in monolayer, eumycetes, schizomycetes and algae as well as for the production of virus, vaccines and biologicals is carried out in the apparatus.

The means of achieving the foregoing and other advantages of the present invention will be readily understood by reference to the following detailed description when considered in conjunction with the drawing, in which.

Figure 1:
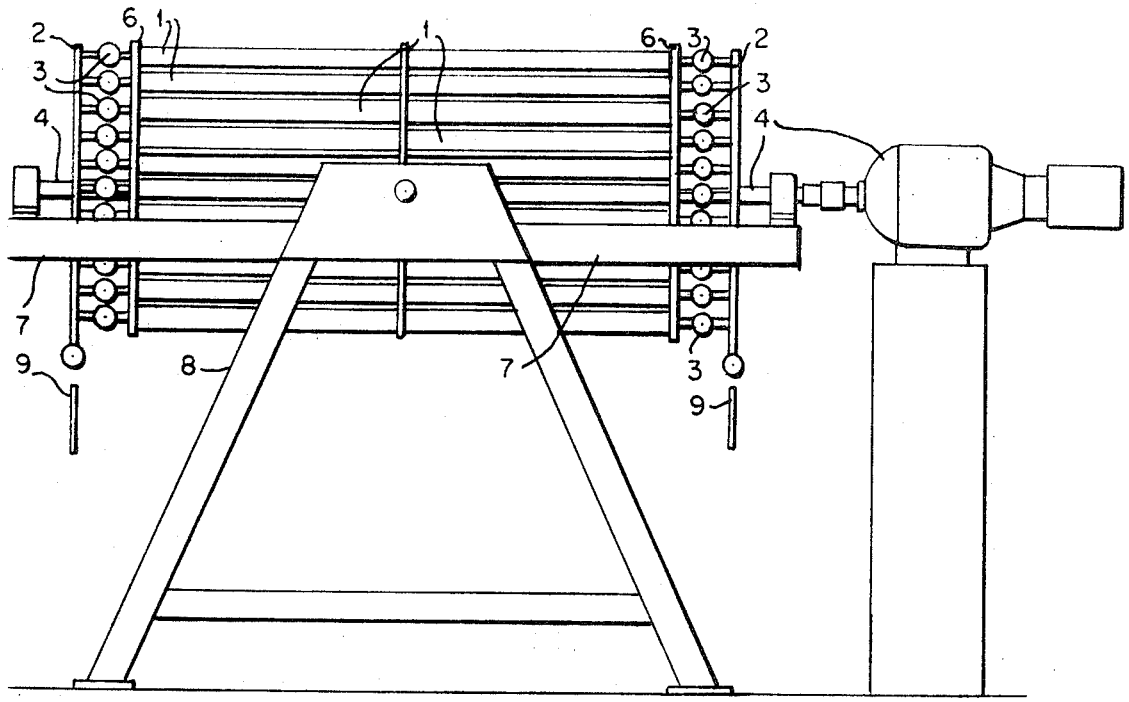
FIG. 1 is a side elevation with the columns 7 horizontal.
Figure 2:
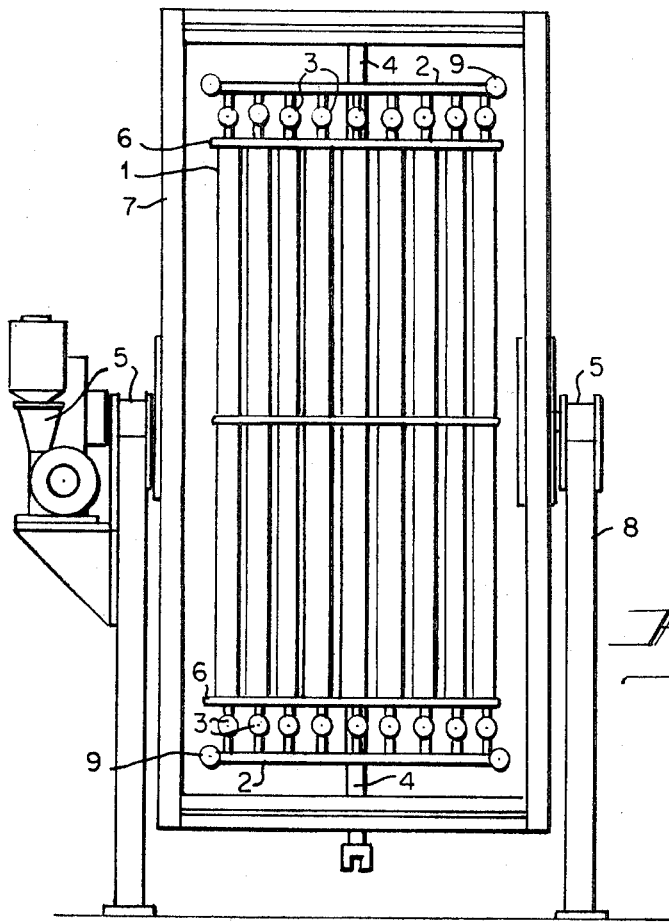
FIG. 2 is an end view with the rotary apparatus in vertical position.

In the drawing there are a number of columns 1 in which cells can grow, end-manifolds 6 for securing the columns 1 in position, and means for rotating the columns 1 bodily about vertical and horizontal axes. Beyond the manifolds 6 are a number of cocks 3 leading to feed manifolds 2 and thence to feed tubes 9. The manifolds 2 and 6 are secured to a shaft and associated means 4 for rotating the columns bodily about a horizontal axis. The shaft is disengageable from the associated means and rotatably journalled with respect to a general support frame 7 (which has legs 8). The support frame 7 is rotatable in a vertical plane about a shaft and by associated means 5 (FIG. 2).

All operations can be carried out simultaneously by opening and closing cocks 3 at the appropriate times. Through the cocks 3 the columns 1 may be connected with different services (detergent, tap water and deionized water, steam, filling pipes discharging and drawing liquids, or gas required for growing the cells). The columns may be connected in toto or individually not only with the different general services but also in a closed line and under sterile conditions with special devices for the distribution duly measured and automatically recorded of liquids such as nutrient media, buffered solutions, cell suspensions, trypsin or other enzymes, virus or pure or mixed gases such as oxygen, air or carbon dioxide. A temporary connection is also possible with special breathing pipes for the carbon dioxide formed during the growth of the cells and with discharge and drawing pipes for liquids. Such devices can provide for the measurement and automatic or semi-automatic recording of different parameters. Measuring and recording means may be connected with devices to correct and maintain the parameters within chosen ranges. Each column or any number of columns may be provided with means for measuring and recording the pH possibly with a device capable of maintaining the culture medium within a desired pH range either by varying the oxygen, air/ carbon dioxide ratio, or by conveying buffered solutions. A microscope may be incorporated in the apparatus to permit observation of the cells in monolayer on the surfaces of the columns themselves at different magnifications all along the columns.

A preferred cycle of action comprises:

washing of the apparatus with a detergent solution by vacuum connection and rinsing with deionized water;
sterilization of the apparatus with steam;
seeding of the apparatus with cell suspension in a growth medium; and
growth of the sown cells on the surface of the columns rotating in horizontal position.

The growth of the cells on the surface may be checked under the microscope as characterized by the formation of a thin opalescent layer on the surface of the columns. When the growth is over, the cells are ready either for enzymatic scission, with trypsin or other suitable enzymes, if the monolayer cells must be utilized for further seeding, or for the production of virus or other biologicals. Once the cells or other biologicals have been collected, the cycle can be begun again by washing the apparatus.

From the above description, it is seen that the "rotary columns" apparatus gives the following advantages:

Opening and closing the cocks of the main manifolds, are carried out in sterile, to provide the same filling and emptying operations necessary for the corresponding number of flasks;

The transfer of the liquids is done by vacuum and pressure;

The apparatus is quickly washed by filling and emptying it with vacuum and pressure, while the other methods require washing machines;

The apparatus is ready in a short time thanks to the sterilization by flowing steam;

The amount of labor is minimized and the operations are safely carried out in sterile conditions avoiding any contamination of the products under working and any danger of the staff to contract infections;

The apparatus may be employed with all the columns, with a partial number or with subsequent phases;

When the apparatus is assembled, it is always ready for other workings;

Although not moveable, it may be connected with services placed in another room by pipes;

Direct microscopic control of the cell growth-phases and of the virus cytopathic effect;

Possibility of trypsinizing easily by direct microscopic control of the monolayer-cells to be utilized in other seedings;

Automatic and semi-automatic adjustment for warm and cold temperature;

Possibility of employing different quantities of growth and maintenance media according to the culture requirements;

Control and rapid automatic or semi-automatic adjustment of the pH during the different working steps; and By employing the apparatus for the growth of cells in monolayer on the inside surface of the columns, the growth is not dependent on the length, diameter and number of columns forming the apparatus.

It must be noted that the ratio between cell culture surface in monolayer and the volume of medium required for growing cells, according to the process and apparatus of the present invention, is much improved when compared with the usual methods.

The necessary quantities of medium, of even expensive enzymes such as trypsine are reduced with great economical advantages and then the liquid media containing the virus already have a concentration useful to the other operations for the preparation of vaccines without further concentrations.

Table No. 1 reports, without limiting, comparative data between Roux flasks, propagators and rotary columns.

TABLE 1

| Vessel | Operating liquid volume (medium) in cm.$^3$ | Culture surface in cm.$^3$ | Ratio surface/ medium volume | Number of corresponding Roux flasks |
|---|---|---|---|---|
| Roux flask | 120 | 250 | 2.09 | |
| 1 l. propagator | 500 | 819 | 1.64 | 5 |
| 7.5 l. propagator | 4,500 | 6,966 | 1.54 | 42 |
| No. 1 rotary column R 5.6 cm. $\phi$. 100.0 cm | 670-350 | 1,758 | 2.62-5.02 | 7 |
| No. 1 rotary column R 8.0 cm. $\phi$. 100.0 cm | 1,074-537 | 2,512 | 2.33-4.67 | 10 |
| No. 1 rotary column R 5.6 cm. $\phi$. 500.0 cm | 3,190-2,500 | 8,792 | 2.75-3.51 | 35 |

Table 1 shows that, under the same conditions, the greater is the ratio surface/medium volume, the better is the use of the medium and the concentration of the biologicals at the end of the operation as above mentioned.

The following examples are to illustrate the invention without limiting it.

EXAMPLE 1

Monolayers of primary culture cells

Organs of mammalia and of other animals are trypsinized according to the classical culture techniques after being removed in the best conditions, chopped until the pieces have a size of 2–5 mm. and washed in buffered solutions. After checking, the collected cells are resuspended in the growth media to the desired concentration for planting. The seeding of the "rotary columns" apparatus, duly washed and sterilized, consists in connecting a pipe between the vessel containing the cell suspension and the apparatus itself in vertical position and in pouring off by vacuum, pressure or peristaltic pump. The different cocks are closed, the afflux of sterile gas mixture (air/ carbon dioxide) is adjusted in the best oxygenation and pH-conditions. After turning the apparatus to a horizontal position, the sown cells are incubated at 36–37° C. The uniform monolayer forming regularly on the surface of the columns may be checked in each phase under the microscope and is completed in the same time as required by other cultures sown in vessels held in stationary position.

Table No. 2 reports some examples of the periods of time required to obtain the complete monolayers in "rotary columns" and in stationary "Roux" flasks.

TABLE 2

| Monolayers of primary cultures from— | Days required to obtain complete monolayers | |
|---|---|---|
| | On rotary columns | In stationary Roux flasks |
| Calf kidney | 5–6 | 5–6 |
| Pig kidney | 5–6 | 5–6 |
| Dog kidney | 3–4 | 3–4 |
| Chick embryo | 2–3 | 2–3 |
| Pig testicle | 3–4 | 3–4 |
| Horse testicle | 3–4 | 3–4 |

EXAMPLE 2

Monolayers of cell strains and established cell lines

The method of the "rotary columns" allows to obtain the industrial scale production of cell lines and cell strains. Once the complete monolayer has formed, different handworks must be carried out in well fixed periods of time by bringing the apparatus several times to the different positions (vertical, horizontal, rotary position, etc.) in order to execute the many trypsinization and collection phases of the cells. The easy handling of the above apparatus enables carrying out readily and accurately the handworks necessary for the trypsinization of one Roux flask. Said handworks may be simultaneously performed by one or two persons, either on the entire apparatus or on a part of it. The sizes and the number of the columns may vary.

Table 3 shows some examples of the data obtained by sowing the "rotary columns" apparatus with $BHK_{21}$ cells. The cells sown came from trypsinization of monolayer apparatus.

TABLE 3

| Vessel | Sown cells per cm.², glass | Collected cells per cm.², glass | Hours of incubation | Multi- plication index |
|---|---|---|---|---|
| Columns | 75,000 | 260,500 | 44 | 3.47 |
| Roux flasks | 75,000 | 248,350 | 44 | 3.31 |
| Columns | 100,000 | 623,162 | 66 | 6.23 |
| Roux flasks | 100,000 | 582,300 | 66 | 5.82 |

Table No. 4 reports the time required to obtain the complete monolayers on "rotary columns" and stationary Roux flasks of some cell lines and cell strains.

TABLE 4

| Designation of cells | Origin | Days required to obtain complete monolayers | |
|---|---|---|---|
| | | On rotary columns | In stationary Roux flasks |
| $BHK_{21}$ | Line Macpherson and Stoker | 2–3 | 2–3 |
| $PK_{15}$ | Line NADL JOWA | 2–3 | 2–3 |
| J.L.S.-V 6 | Line J.L.S. Memorial Cancer Res. Dept. Viral Oncology, Maywood, N.Y. | 2–3 | 2–3 |
| C.T. | Strains from calf thyroid [1] | 2–3 | 2–3 |
| L.T. | Strains from lamb testicle [1] | 3–4 | 3–4 |
| L.S.P. | Strains from lung of sheep phoetum [1] | 3–4 | 3–4 |
| D.K. | Strains from dog kidney [1] | 3–4 | 3–4 |

[1] Collection of our laboratory.

EXAMPLE 3

Production of Foot-and-Mouth Disease Virus C (F.M.D.V.)

Operating as in Example 1 and employing a pig kidney, a uniform monolayer is obtained after 5–6 days of incubation. The culture medium is then removed by washing the monolayer and replacing it with a maintenance medium of the cells during the production of the virus, in closed line and in sterile with the entirely automated technique as above described. A F.M.D.V. C-strain is introduced together with the above maintenance medium. After the sowing of virus, the apparatus is brought under the best aeration-, pH- and temperature-conditions and the virus starts growing. Drawings at regular intervals of time are always effected in closed line and in sterile to test the growth of the virus. The maximum of the production is reached after 15–24 hours of incubation. Tissue Culture Infection Dose 50 (T.C.I.D.$_{50}$ per 0.1) = $10^{6.5}$–$10^{7.0}$.

Analogous results are obtained if a calf kidney or $B.H.K._{21}$ cells are utilized instead of a pig kidney as source of primary- or line cells.

EXAMPLE 4

Production of the New Castle Disease Virus (N.C.D.V.)

Operating as in Example 3, but employing a N.C.D.V. strain, an infective titer 50 ($EID_{50}$) is obtained on embryonated eggs × 0.1 = $10^{6.5}$–$10^{7.0}$ after 28–72 hours of incubation.

Analogous results are obtained if a calf kidney or $B.H.K._{21}$ cells are utilized instead of a pig kidney as source of primary- or line-cells.

EXAMPLE 5

Operating as described in the previous examples, but employing other virus strains, are obtained productions of the following virus: canine distemper (CDV), infectious bovine rhinotracheitis (IBR), "mucosal disease" (M.D.V.), para influenza (P.I.), rabies (R.V.), infectious canine haepatitis (C.H.V.), measles virus and others both in veterinary and human field.

EXAMPLE 6

Operating under suitable conditions cultures of eumycetes such as for example, *Penicillium chrysogenum*, schizomycetes such as *Bacillus subtilis* and unicellular algae such as Chlorella have been effected.

I claim:

1. Apparatus for growing living cells of animal origin as well as eumycetes, schizomycetes and unicellular algae on a suitable medium which consists of a plurality of columns of uniform length in which cells can grow, said columns are clamped together at the ends by manifolds which are fixed onto a shaft parallel to said columns about which said shaft the columns may be rotated; said clamped columns being also fixed onto a support frame; means for rotating the shaft and clamped columns about a horizontal axis; and means for rotating the support frame in a vertical plane.

2. Apparatus of claim 1, wherein the manifolds of the columns have means that permit connection in closed line and under sterile conditions with means for providing pipeline water, detergent, steam, deionized water, drive-pipe for the gases required to grow the cells, drive-pipe for the additions of media, buffered solutions and trypsine, and exhaust- or drawing pipe for gases or liquids.

3. The apparatus of claim 2, wherein the drive-pipe for gases is provided with means controlling and recording the inlet gas-volume by a self-intervening device.

4. The apparatus of claim 1 wherein the columns are provided with a pH-controller and recorder in order to maintain the culture medium within a selected pH range.

5. The apparatus of claim 1, wherein the apparatus is placed in a room or surrounded with a thermo-adjustable jacket provided with self-intervening devices for maintaining the culture medium within a selected temperature range.

References Cited

UNITED STATES PATENTS 2,996,429   8/1961   Toulmin ......... 195—142 X

ALVIN E. TANENHOLTZ, Primary Examiner
W. A. SIMONS, Assistant Examiner

U.S. Cl. X.R.

47—1.4; 195—1.7, 127 142, 143